(12) United States Patent
Holman et al.

(10) Patent No.: US 8,757,303 B2
(45) Date of Patent: Jun. 24, 2014

(54) SUSPENSION UNIT

(75) Inventors: Tim Holman, Nailsea (GB); Robert D'Aubyn, Bath (GB)

(73) Assignee: Horstman Defence Systems Limited, Bath (GB)

(*) Notice: Subject to any disclaimer, the term of this patent is extended or adjusted under 35 U.S.C. 154(b) by 179 days.

(21) Appl. No.: 13/114,127

(22) Filed: May 24, 2011

(65) Prior Publication Data

US 2012/0126611 A1 May 24, 2012

(30) Foreign Application Priority Data

May 25, 2010 (GB) .................................. 1008709.6

(51) Int. Cl.
*B62D 55/112* (2006.01)
(52) U.S. Cl.
CPC .................................. *B62D 55/112* (2013.01)
USPC ................. 180/9.5; 280/124.11; 280/124.129
(58) Field of Classification Search
USPC ....................... 180/9, 9.5, 9.52; 188/269–270; 280/5.514, 5.515, 124.11, 124.128, 280/124.129
See application file for complete search history.

(56) References Cited

U.S. PATENT DOCUMENTS

| | | | |
|---|---|---|---|
| 3,183,016 A * | 5/1965 | Gustafsson | 280/6.156 |
| 3,459,439 A | 8/1969 | Sinclair et al. | |
| 3,614,125 A * | 10/1971 | Sinclair et al. | 280/6.157 |
| 4,079,923 A * | 3/1978 | Kirchner | 267/64.13 |
| 4,156,536 A | 5/1979 | Brandstadter | |
| 4,447,073 A | 5/1984 | Brandstadter | |
| 4,537,422 A | 8/1985 | O'Rourke | |
| 4,552,344 A | 11/1985 | Johnson | |
| 4,700,969 A * | 10/1987 | Joseph | 280/6.157 |
| 4,700,970 A * | 10/1987 | Joseph | 280/124.129 |

(Continued)

FOREIGN PATENT DOCUMENTS

| | | |
|---|---|---|
| DE | 3637387 A1 | 5/1988 |
| EP | 0450942 A2 | 10/1991 |

(Continued)

OTHER PUBLICATIONS

UK Search Report Issued on Aug. 23, 2010 for Application No. GB1008709.6, 1 page.

(Continued)

*Primary Examiner* — Anne Marie Boehler
*Assistant Examiner* — Maurice Williams
(74) *Attorney, Agent, or Firm* — Gesmer Updegrove LLP

(57) ABSTRACT

A suspension unit 1 comprising a resilient arrangement 37 is provided. The damping arrangement 37 comprises a chamber having a primary volume arranged to contain a primary fluid and jounce and rebound variable volumes 58, 60 arranged to contain jounce and rebound fluids respectively. A piston 38 is slidably disposed in the chamber so as to act on the primary fluid and jounce and rebound moveable members 54, 56 separate the primary fluid from jounce and rebound volumes 58, 60 respectively. A jounce abutment member 55 is provided to limit the movement of the jounce moveable member 54 and a rebound abutment member 57 is provided to limit the movement of the rebound moveable member 56. When in use and the piston 38 is in a static position, the jounce moveable member 54 abuts the jounce abutment member 55 and the rebound moveable member 56 abuts the rebound abutment 57 member over a range of temperatures. When used with a vehicle, the vehicle can maintain a constant ride hide at the static vehicle position over the temperatures range.

28 Claims, 4 Drawing Sheets

(56) References Cited

U.S. PATENT DOCUMENTS

| | | | |
|---|---|---|---|
| 4,720,085 A * | 1/1988 | Shinbori et al. | 267/64.16 |
| 4,721,327 A | 1/1988 | Chauveau et al. | |
| 4,795,008 A | 1/1989 | Joseph et al. | |
| 4,858,736 A | 8/1989 | Arnaud et al. | |
| 5,105,918 A | 4/1992 | Hagiwara et al. | |
| 5,183,287 A * | 2/1993 | VanSweden | 280/124.129 |
| 5,324,065 A | 6/1994 | Derrien et al. | |
| 5,651,629 A | 7/1997 | Wall et al. | |
| 7,963,537 B2 * | 6/2011 | Stockford | 280/124.128 |
| 2009/0260902 A1 * | 10/2009 | Holman et al. | 180/6.7 |

FOREIGN PATENT DOCUMENTS

| | | |
|---|---|---|
| EP | 0525957 A1 | 2/1993 |
| EP | 1418364 A1 | 5/2004 |
| GB | 1597922 A | 9/1981 |
| GB | 2313203 A | 11/1997 |
| JP | 62011156 A | 1/1987 |
| JP | 2009101864 A | 5/2009 |
| WO | 2004076211 A1 | 9/2004 |

OTHER PUBLICATIONS

UK Search Report Issued on Feb. 10, 2011 for Application No. GB1008705.4, 1 page.

UK Search Report Issued on Aug. 18, 2010 for Application No. GB1008708.8, 1 page.

UK Search Report Issued on Aug. 16, 2010 for Application No. GB1008706.2, 1 page.

UK Search Report Issued on Sep. 20, 2011 for Application No. GB 1108677.4, 1 page.

UK Search Report Issued on Aug. 17, 2010 for Application No. GB1008707.0, 1 page.

* cited by examiner

SUSPENSION UNIT

PRIORITY

The present application claims the benefit of British Patent Application No. 1008709.6 filed on 25 May 2010, which is incorporated herein in its entirety.

BACKGROUND

This invention relates to a suspension unit, and is particularly, although not exclusively, concerned with a suspension unit for use on a tracked vehicle.

A tracked vehicle has a track extending around a series of track guide wheels. At least some of the guide wheels support the weight of the vehicle hull on the section of the track which is in contact with the ground. In this specification, the expression "hull" is used to refer to the main body of the vehicle. The hull serves the same purpose as the chassis of a conventional vehicle, whether or not the chassis is constituted wholly or partially by the bodywork of the vehicle. Consequently, in the context of the present invention, the word "hull" is considered to be equivalent to a vehicle chassis.

The track guide wheels which support the weight of the vehicle on the ground need to be connected to the vehicle hull by a suspension arrangement which enables the track guide wheel to move upwardly and downwardly relatively to the hull.

In a previously considered suspension unit a gas spring is used to support the vehicle load and the ride height of the vehicle is governed by the volume of the gas in the gas spring. While such a suspension unit is suitable for certain applications, when the temperature of the gas changes, the volume of the gas will also change. Such a temperature change will therefore cause the ride height of the vehicle to change. For example, a temperature change of over 40° C. may occur between day and night temperatures in some climates. This may mean that the ride height of a static vehicle may decrease overnight as the temperature drops which can result in the vehicle becoming grounded and therefore immovable.

It is therefore desirable to provide a suspension unit for a vehicle which can maintain a constant ride height over a range of temperatures.

SUMMARY

The present invention is defined in the attached independent claim to which reference should now be made. Further, preferred features may be found in the sub-claims appended thereto.

According to an aspect of the present invention there is provided a suspension unit comprising: a resilient arrangement comprising a chamber having a primary volume arranged to contain a primary fluid; jounce and rebound variable volumes arranged to contain jounce and rebound fluids respectively; a piston slidably disposed in the chamber so as to act on the primary fluid; a jounce moveable member which separates the primary and jounce volumes and which is moveable so as to alter the jounce variable volume; a rebound moveable member which separates the primary and rebound volumes and which is moveable so as to alter the rebound variable volume; a jounce abutment member arranged to limit the movement of the jounce moveable member so as to define the maximum volume of the jounce variable volume; and a rebound abutment member arranged to limit the movement of the rebound moveable member so as to define the minimum volume of the rebound variable volume; wherein when in use and the piston is in a static position the jounce moveable member abuts the jounce abutment member and the rebound moveable member abuts the rebound abutment member over a temperature range. When used with a vehicle, the vehicle can maintain a constant ride hide at the static vehicle position over a range of temperatures.

The jounce moveable member can be arranged such that the jounce fluid acts on one side of the jounce moveable member and the primary fluid acts on the other side of the jounce moveable member and the rebound moveable member can be arranged such that the rebound fluid acts on one side of the rebound moveable member and the primary fluid acts on the other side of the rebound moveable member.

When the piston moves in the jounce direction, the jounce moveable member may move away from the jounce abutment member, thereby reducing the volume of the jounce variable volume, and the rebound moveable member may abut the rebound abutment member. When the piston moves in the rebound direction, the jounce moveable member may abut the jounce abutment member and the rebound moveable member may move away from the rebound abutment member, thereby increasing the volume of the rebound variable volume.

In use, the primary volume contains a primary fluid and the jounce and rebound volumes contain jounce and rebound fluids respectively. The pressures of the fluids can be set such that when the piston is in the static position, the force generated by the static pressure of the primary fluid acting on the rebound moveable member is higher than the force generated by the pressure of the rebound fluid acting on the rebound moveable member and the force generated by the static pressure of the primary fluid acting on the jounce moveable member is lower than the force generated by the pressure of the jounce fluid acting on the jounce moveable member over a temperature range. The temperature range may be at least 10 centigrade degrees, or at least 20 centigrade degrees, or at least 30 centigrade degrees, or at least 40 centigrade degrees, or at least 50 centigrade degrees.

The primary fluid and/or the jounce fluid and/or the rebound fluid may be a hydraulic fluid, such as oil or a gas such as nitrogen.

At least a portion of the primary volume may be disposed between the rebound and jounce volumes so that the primary fluid acts on the rebound and jounce moveable members. The chamber may be defined by a first cylinder within which the piston is disposed and a second cylinder, wherein the jounce and rebound moveable members are disposed in the second cylinder, and wherein the interior of the first cylinder is in fluid communication with a volume in the second cylinder located between the jounce and rebound moveable members through a fluid passageway. The suspension unit may further comprise an internal cylinder which is disposed within the second cylinder and within which the rebound or jounce moveable member is disposed, wherein a portion of the fluid passageway is defined between an outer wall of the internal cylinder and the inner wall of the second cylinder. The first and second cylinders may be substantially parallel.

The jounce and/or rebound moveable member may be a piston slidably disposed in the chamber. The jounce and/or rebound abutment member may be a shoulder, such as an annular shoulder formed in the chamber wall, or an end stop.

The suspension unit may further comprise a primary volume port and/or a jounce volume port and/or a rebound volume port for injecting fluid into (or removing fluid from) the respective volume. These ports allow fluid to be injected into or withdrawn from the respective volumes so as to alter the characteristic of the suspension unit. For example, the ride height of the vehicle can be changed by changing the amount of primary fluid, such as oil, within the primary volume.

The suspension unit may further comprise a hub and a suspension arm which is mounted on the hub for pivoting movement about an axis of the hub, the suspension arm being provided with a wheel-supporting shaft which is parallel to and spaced from the hub axis, and wherein the resilient arrangement is accommodated within the suspension arm, wherein the piston is connected by a connecting rod to a crank pin supported by the hub at a position spaced from the hub axis, whereby pivoting of the suspension arm about the hub is accompanied by displacement of the piston.

The invention also concerns a vehicle having a suspension unit in accordance with any statement herein. The vehicle may be a tracked vehicle, the suspension unit supporting a track guide wheel of the vehicle.

The invention may comprise any combination of the features and/or limitations referred to herein, except combinations of such features as are mutually exclusive.

BRIEF DESCRIPTION OF THE DRAWINGS

Embodiments of the present invention will now be described, by way of example only, with reference to the accompanying drawings, in which.

DETAILED DESCRIPTION

Figure 1:
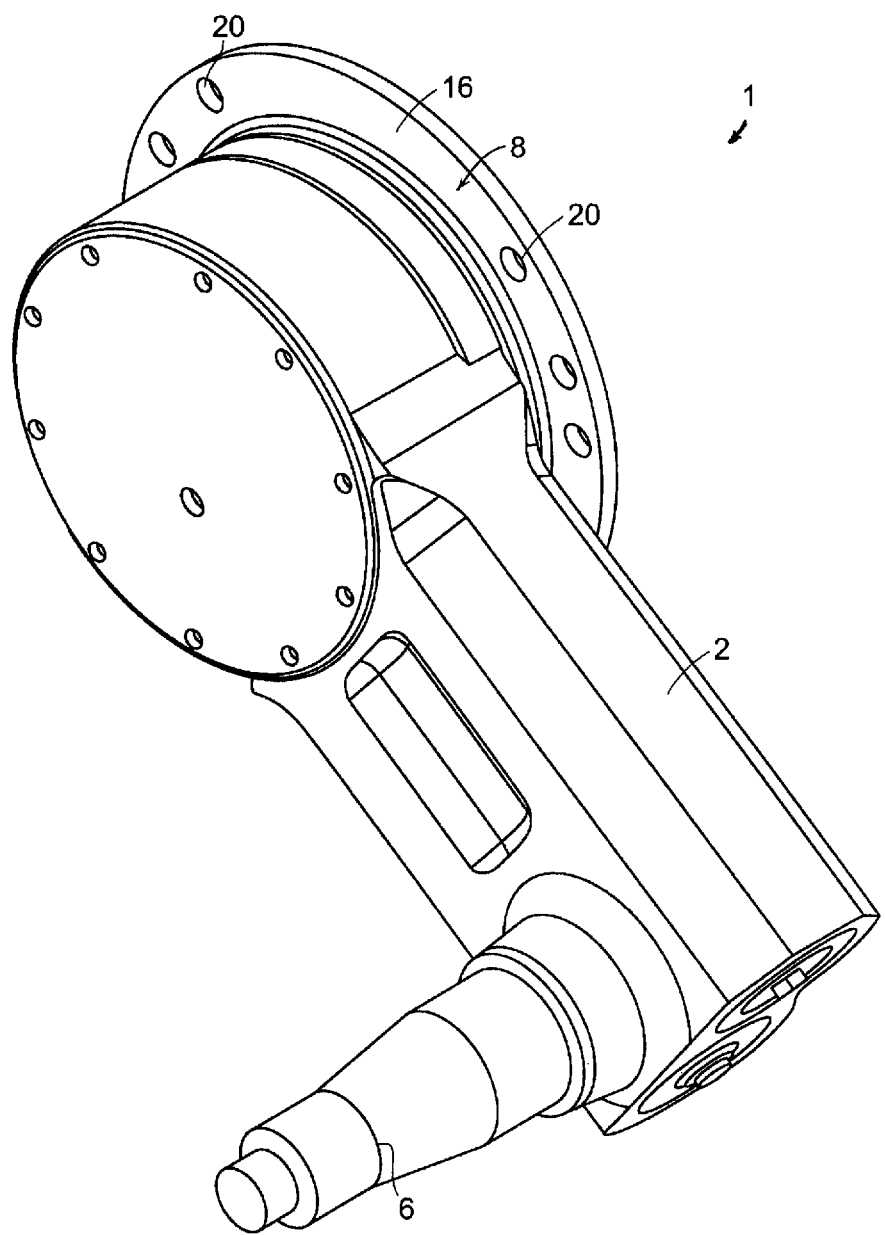
FIG. 1 schematically shows a suspension unit.

As shown in FIG. 1, the suspension unit 1 comprises a suspension arm 2 which is rotatable at one end about a hub 4 (not shown in FIG. 1) which is provided with a connector element 8 having a flange 16. At the other end, the suspension arm 2 is provided with a wheel-supporting shaft 6.

When the suspension unit is mounted on a vehicle, the connector element 8 is secured to the vehicle hull or chassis (not shown) by means of bolts which pass through countersunk holes 20 in the flange 16 into screw threaded holes in the vehicle hull.

The suspension arm 2, with the hub 4 and all other internal components, is pre-assembled and supplied as a unit.

Figure 2:
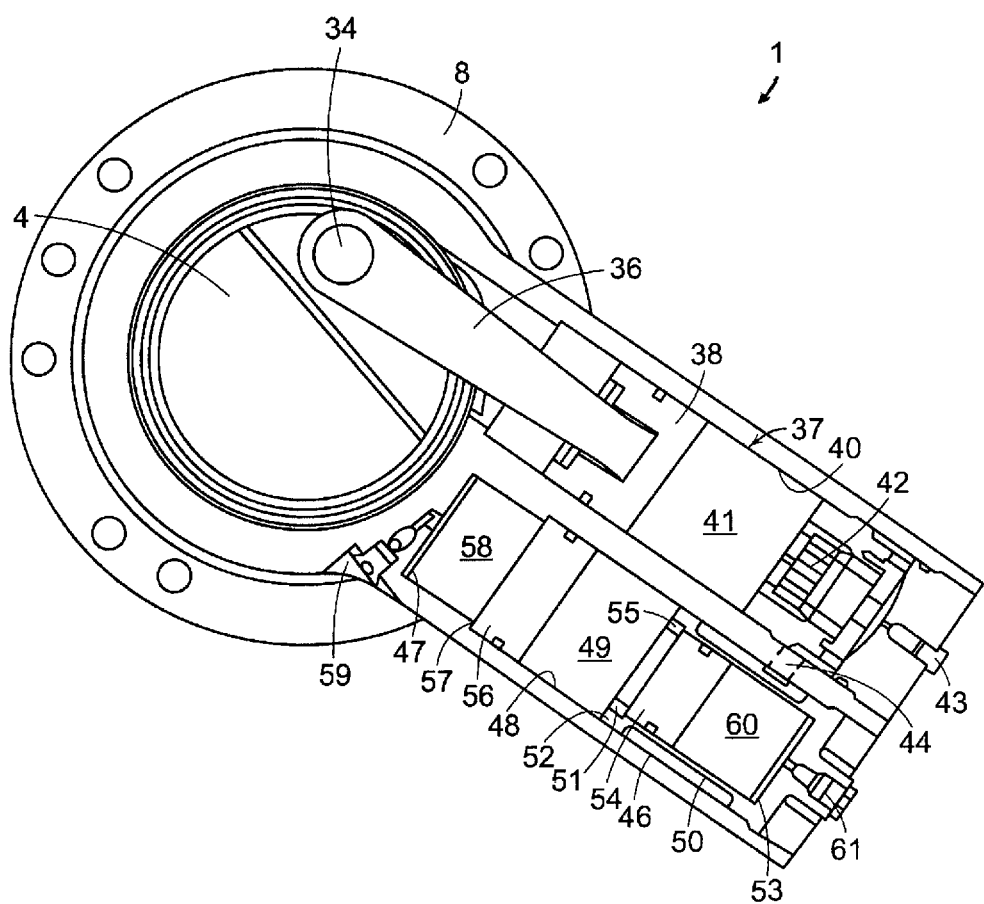
FIG. 2 is a sectional view schematically showing the suspension unit in a static condition.
Figure 3:
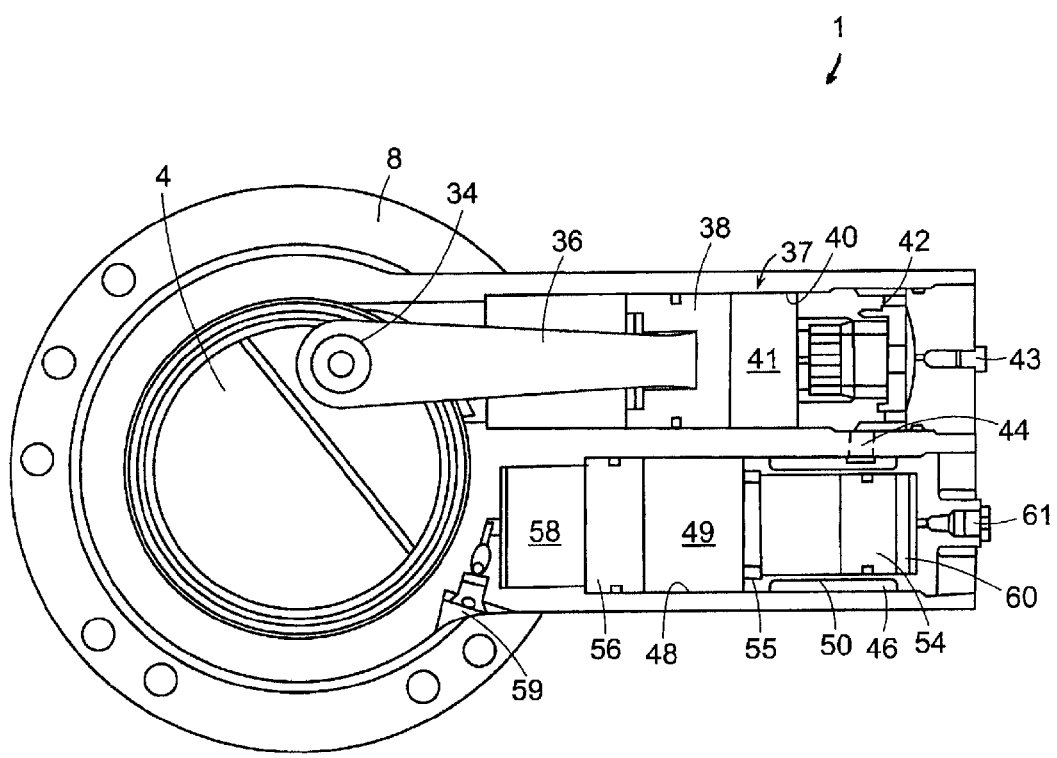
FIG. 3 corresponds to FIG. 2 but schematically shows the suspension unit in a jounce condition.
Figure 4:
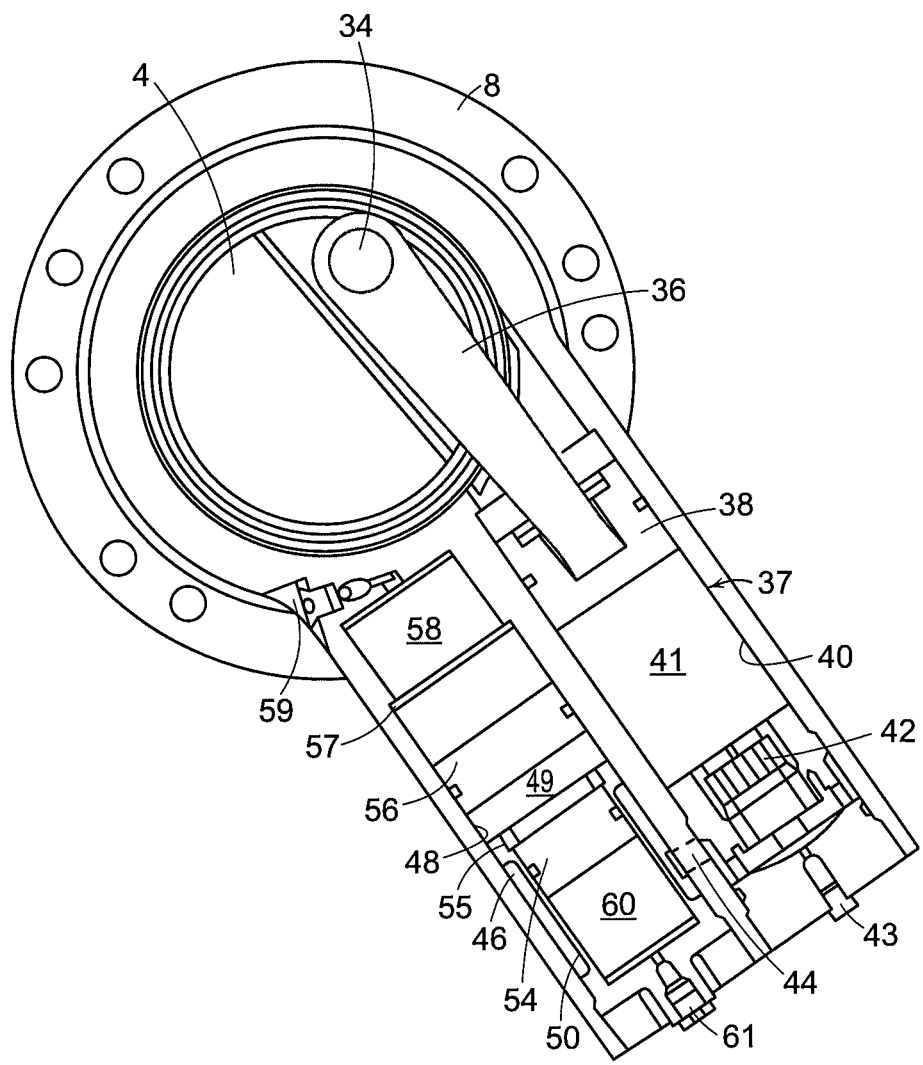
FIG. 4 corresponds to FIGS. 2 and 3 but schematically shows the suspension unit in a rebound condition.

The suspension arm 2 accommodates a resilient arrangement 37 which is shown in FIGS. 2 to 4. The resilient arrangement 37 comprises a chamber having a primary volume, a rebound variable volume 58 and a jounce variable volume 60.

The chamber is defined by a first cylinder 40 and a second cylinder 48 which is substantially parallel to the first cylinder 40. A piston 38 is slidably displaceable in the first cylinder 40 and is attached to one end of a connecting rod 36. The other end of the connecting rod 36 is connected to a crank pin 34 which is carried by the hub 4.

A rebound moveable member in the form of a rebound piston 56 is slidably disposed in the second cylinder 48. The rebound variable volume 58 is defined between a first end 47 of the second cylinder 48 and the rebound piston 56. A rebound abutment member, in the form of an annular shoulder 57 formed by the inner wall of the second cylinder 48, is provided which limits the movement of the rebound piston 56 towards the first end. The annular shoulder 57 defines the minimum volume of the rebound variable volume 58.

An internal cylinder 50 is disposed in the second cylinder 48 on the side opposite the rebound variable volume 58. A jounce moveable member in the form of a jounce piston 54 is slidably disposed in the internal cylinder 50. The jounce variable volume 60 is defined between an end 53 of the internal cylinder 50 and the jounce piston 54. A jounce abutment member in the form of an end stop 55 is screwed into the end of the internal cylinder 50 and limits the movement of the jounce piston 54 away from the end 53 of the internal cylinder 50. The end stop 55 defines the maximum volume of the jounce variable volume 60.

The internal cylinder 50 is spaced from the inner surface of the second cylinder 48 over the majority of its length so as to define an annular fluid passageway 46 between the inner surface of the second cylinder 48 and the outer surface of the internal cylinder 50. An end 51 of the internal cylinder 50 contacts the inner surface of the second cylinder 48 and is provided with axially extending passageways 52 that provide fluid communication between the annular fluid passageway 46 and an intermediate volume 49 in the second cylinder 48 that is located between the jounce piston 54 and the rebound piston 56.

The internal volume 41 of the first cylinder 40 communicates with the intermediate volume 49 through a damping unit 42, a passageway 44 which fluidly connects the first and second cylinders, the annular passageway 46 and the axially extending passageways 52.

The suspension unit 1 is provided with a primary volume port 43, a rebound volume port 59 and a jounce volume port 61. These ports 43, 59, 61 allow fluid to be injected into the respective volumes, or removed from the volumes as necessary. The ports 43, 49, 61 are essentially a fluid passageway with a valve disposed therein which is opened when fluid is injected into or removed from the volume.

For operation, a primary fluid in the form of oil or other hydraulic fluid fills the internal volume 41 of the first cylinder 40 to the right of the first piston 38 as seen in FIG. 2, the damping unit 42, the passageway 44, the annular fluid passageway 46, the axially extending passageways 52 and the intermediate volume 49. The volume filled by the oil is collectively referred to as the primary volume. Gas, such as nitrogen, under pressure is present in the rebound and jounce variable volumes 58 and 60. The quantity of gas in the volumes 58 and 60 is selected to achieve the characteristics described below.

In operation, the suspension unit functions as follows.

When fitted to a vehicle, the weight of the vehicle will tend to rotate the arm 2 in the counter-clockwise direction (as seen in FIG. 2) about the hub 4. Since the crank pin 34 is eccentrically mounted on the hub 4, this rotation will tend to drive the piston 38 to the right (as seen in FIG. 2).

In the static condition (ie when the suspension unit is supporting the weight of the vehicle and the vehicle is static) shown in FIG. 2, the piston 38 is situated approximately midway along the first cylinder 40 and acts on the oil (primary fluid) in the primary volume with the weight of the vehicle. The pressure of the gas (jounce fluid) in the jounce volume 60 is greater than the pressure of the oil and therefore the jounce piston 54 abuts the end stop 55. This means that the jounce variable volume 60 is at a maximum. The pressure of the gas (rebound fluid) in the rebound volume 58 is less than the pressure of the oil and therefore the rebound piston 56 abuts the shoulder 57. This means that the rebound variable volume 58 is at a minimum. Consequently, the height of the vehicle hull above the ground is determined by the amount of oil in the primary volume. In order to increase the ride height of the vehicle, more oil can be injected into the primary volume through the injection port 43, so as to force the arm 2 to rotate in the clockwise direction about the hub 4. Consequently, in order to lower the ride height of the vehicle, oil can be removed from the primary volume through the injection port 43.

Should the vehicle, when travelling, encounter an obstacle above the general level of the surface over which the vehicle is travelling, the track guide wheel mounted on the shaft 6 will rise relative to the vehicle. The resulting jounce condition is shown in FIG. 3. Since the suspension arm 2 has rotated about the central axis of the hub 4, while the hub 4 remains stationary with respect to the vehicle, the piston 38 has moved relative to the first cylinder 40, in a direction towards the damping unit 42. Oil is therefore displaced from the first cylinder 40, at a controlled rate determined by the damping unit 42, to the annular passageway 46, and thence to the intermediate volume 49 between the jounce and rebound pistons 54, 56.

The pressure of the oil in the primary volume increases and acts on both the jounce and rebound pistons 54, 56. The pressure of the oil during jounce rises above the pressure of the gas in the rebound volume 58 that is separated from the oil by the rebound piston 56. However, since the rebound piston rests against the shoulder 57, the rebound volume 58 is at a minimum and the rebound piston 56 cannot move. The increase in pressure of the oil acting on the jounce piston 54 causes the gas in the jounce volume 60 to be compressed and therefore the jounce piston 54 begins to move away from the end stop 55. The jounce variable volume 60 is reduced by the movement of the jounce piston 54 such that the pressure of the gas in the jounce volume 60 is the same as the pressure of the oil.

FIG. 4 shows the rebound condition, in which the track guide wheel mounted on the shaft 6 moves away from the static condition in the direction of increasing distance of the track guide wheel from the vehicle hull. In this condition, the piston 38 moves away from the damping unit 42, so that oil is drawn from the second cylinder 48 into the first cylinder 40. The pressure of the oil falls below the pressure of the gas in the jounce volume 54 and therefore the jounce piston 54 abuts the end stop 55 of the internal cylinder 50, so its position does not change during rebound beyond the static position. However, the reduction in pressure of the oil acting on the rebound piston 56 allows the gas in the rebound volume 58 to expand and therefore the rebound piston begins to move away from the shoulder 57. The rebound variable volume 58 is increased by the movement of the rebound piston 56 such that the pressure of the gas in the rebound volume 58 is the same as the pressure of the oil.

The suspension unit 1 is able to accommodate relatively large ambient temperature changes at the static position without the ride height of the vehicle changing.

As the ambient temperature reduces, the pressure of the gas in the rebound volume 58 and the pressure of the gas in the jounce volume 60 reduces. The jounce volume 60 is charged with a quantity of gas such that, at the minimum temperature of operation, the pressure is still greater than the static pressure of the oil. Since the pressure of the gas in the jounce volume 60 is greater than that of the oil in the primary volume, the jounce piston 54 is forced against the end stop 55. Even though the pressure of the gas in the rebound volume 58 is less than that of the oil, the rebound piston 56 does not move because it abuts the shoulder 57. Since both the jounce piston 54 and the rebound piston 56 rest against the respective abutment members 55, 57 even when the temperature decreases, the static vehicle height is maintained.

As the ambient temperature increases, the pressure of the gas in the rebound volume 58 and the pressure of the gas in the jounce volume 60 increases. The rebound volume 58 is charged with a quantity of gas such that, at the maximum temperature of operation, the pressure is still less than the static pressure of the oil. Since the pressure of the gas in the rebound volume 58 is less than that of the oil in the primary volume, the rebound piston 56 is forced against the end stop 55. Even though the pressure of the gas in the jounce volume 60 is greater than that of the oil, the jounce piston 54 does not move because it abuts the end stop 55. Since both the jounce piston 54 and the rebound piston 56 rest against the respective abutment members 55, 57 even when the temperature increases, the static vehicle height is maintained.

In summary, the jounce volume 60 is charged with gas such that, within the operational temperature range, its pressure is always higher than the static pressure of the oil. The rebound volume 58 is charged with gas such that, within the operational temperature range, its pressure is always lower than the static pressure of the oil. This means that at the static position of the piston, and therefore the vehicle, the height of the vehicle never changes due to a temperature change within the operational temperature range. This prevents a vehicle from lowering and becoming grounded in the event of an overnight temperature drop.

The operational temperature range is the temperature range over which the suspension unit is designed to perform. The operational temperature range may be 40 centigrade degrees or more. The suspension unit may have an operational temperature range of at least 10 centigrade degrees, or at least 20 centigrade degrees, or at least 30 centigrade degrees, or at least 40 centigrade degrees, or at least 50 centigrade degrees, for example. The suspension unit may be designed for other suitable temperature ranges.

Although it has been described that the suspension unit is an in-arm suspension unit, the suspension unit may be any other type of suspension unit.

The invention claimed is:

1. A suspension unit comprising:
   a resilient arrangement comprising:
   a chamber having a primary volume arranged to contain a primary fluid;
   jounce and rebound variable volumes arranged to contain jounce and rebound fluids respectively;
   a piston slidably disposed in the chamber so as to act on the primary fluid;
   a jounce moveable member which separates the primary and jounce volumes and which is moveable so as to alter the jounce variable volume;
   a rebound moveable member which separates the primary and rebound volumes and which is moveable so as to alter the rebound variable volume;
   a jounce abutment member arranged to limit the movement of the jounce moveable member so as to define the maximum volume of the jounce variable volume; and
   a rebound abutment member spaced apart from a fixed end wall defining the rebound variable volume, said rebound abutment member being arranged to limit the movement of the rebound moveable member so as to define the minimum volume of the rebound variable volume;
   wherein when in use and the piston is in a static position the jounce moveable member abuts the jounce abutment member and the rebound moveable member abuts the rebound abutment member over a temperature range; and
   wherein the primary volume contains a primary fluid and the jounce and rebound volumes contain jounce and rebound fluids respectively, and wherein the pressures of the fluids are set such that when the piston is in the static position, the force generated by the static pressure of the primary fluid acting on the rebound moveable member is higher than the force generated by the pressure of the rebound fluid acting on the rebound moveable member and the force generated by the static pressure of the primary fluid acting on the jounce moveable member is lower than the force generated by the pressure of the jounce fluid acting on the jounce moveable member over a temperature range.

2. A suspension unit according to claim 1, wherein the primary fluid and/or the jounce fluid and/or the rebound fluid is a hydraulic fluid or a gas.

3. A suspension unit according to claim 1, wherein the temperature range is at least 10 centigrade degrees.

4. A suspension unit according to claim 1, wherein at least a portion of the primary volume is disposed between the rebound and jounce volumes.

5. A suspension unit according to claim 4, wherein the chamber is defined by a first cylinder within which the piston is disposed and a second cylinder, wherein the jounce and rebound moveable members are disposed in the second cylinder, and wherein the interior of the first cylinder is in fluid communication with a volume in the second cylinder between the jounce and rebound moveable members through a fluid passageway.

6. A suspension unit according to claim 5, further comprising an internal cylinder which is disposed within the second cylinder and within which the jounce moveable member is disposed, wherein a portion of the fluid passageway is defined between an outer wall of the internal cylinder and the inner wall of the second cylinder.

7. A suspension unit according to claim 5, wherein the first and second cylinders are substantially parallel.

8. A suspension unit according to claim 1, wherein the jounce and/or rebound moveable member is a piston slidably disposed in the chamber.

9. A suspension unit according to claim 8, wherein the jounce and/or rebound abutment member is a shoulder.

10. A suspension unit according to claim 1, further comprising a primary volume port and/or a jounce volume port and/or a rebound volume port for injecting fluid into the respective volume.

11. A suspension unit according to claim 1, further comprising a hub and a suspension arm which is mounted on the hub for pivoting movement about an axis of the hub, the suspension arm being provided with a wheel-supporting shaft which is parallel to and spaced from the hub axis, and wherein the resilient arrangement is accommodated within the suspension arm, wherein the piston is connected by a connecting rod to a crank pin supported in by the hub at a position spaced from the hub axis, whereby pivoting of the suspension arm about the hub is accompanied by displacement of the piston.

12. A vehicle having a suspension unit in accordance with claim 1.

13. A vehicle as claimed in claim 12, wherein the vehicle is a tracked vehicle, the suspension unit supporting a track guide wheel of the vehicle.

14. A suspension unit according to claim 1, wherein the temperature range is at least 20 centigrade degrees.

15. A suspension unit according to claim 1, wherein the temperature range is at least 30 centigrade degrees.

16. A suspension unit according to claim 1, wherein the temperature range is at least 40 centigrade degrees.

17. A suspension unit according to claim 1, wherein the temperature range is at least 50 centigrade degrees.

18. A suspension unit comprising:
a resilient arrangement comprising:
a chamber having a primary volume arranged to contain a primary fluid;
jounce and rebound variable volumes arranged to contain jounce and rebound fluids respectively;
a piston slidably disposed in the chamber so as to act on the primary fluid;
a jounce moveable member which separates the primary and jounce volumes and which is moveable so as to alter the jounce variable volume;
a rebound moveable member which separates the primary and rebound volumes and which is moveable so as to alter the rebound variable volume;
a jounce abutment member arranged to limit the movement of the jounce moveable member so as to define the maximum volume of the jounce variable volume; and
a rebound abutment member spaced apart from a fixed end wall defining the rebound variable volume, said rebound abutment member being arranged to limit the movement of the rebound moveable member so as to define the minimum volume of the rebound variable volume;
wherein when in use and the piston is in a static position the jounce moveable member abuts the jounce abutment member and the rebound moveable member abuts the rebound abutment member over a temperature range.

19. A suspension unit according to claim 18, wherein the primary volume contains a primary fluid and the jounce and rebound volumes contain jounce and rebound fluids respectively, and wherein the pressures of the fluids are set such that when the piston is in the static position, the force generated by the static pressure of the primary fluid acting on the rebound moveable member is higher than the force generated by the pressure of the rebound fluid acting on the rebound moveable member and the force generated by the static pressure of the primary fluid acting on the jounce moveable member is and lower than the force generated by the pressure of the jounce fluid acting on the jounce moveable member over a temperature range.

20. A suspension unit according to claim 18, wherein the temperature range is at least 10 centigrade degrees.

21. A suspension unit according to claim 18, wherein the chamber is defined by a first cylinder within which the piston is disposed and a second cylinder, wherein the jounce and rebound moveable members are disposed in the second cylinder, and wherein the interior of the first cylinder is in fluid communication with a volume in the second cylinder between the jounce and rebound moveable members through a fluid passageway.

22. A suspension unit according to claim 21, further comprising an internal cylinder which is disposed within the second cylinder and within which the jounce moveable member is disposed, wherein a portion of the fluid passageway is defined between an outer wall of the internal cylinder and the inner wall of the second cylinder.

23. A suspension unit according to claim 18, wherein the jounce and/or rebound abutment member is a shoulder.

24. A vehicle having a suspension unit in accordance with claim 18, wherein the vehicle is a tracked vehicle, the suspension unit supporting a track guide wheel of the vehicle.

25. A suspension unit according to claim 18, wherein the temperature range is at least 20 centigrade degrees.

26. A suspension unit according to claim 18, wherein the temperature range is at least 30 centigrade degrees.

27. A suspension unit according to claim 18, wherein the temperature range is at least 40 centigrade degrees.

28. A suspension unit according to claim 18, wherein the temperature range is at least 50 centigrade degrees.

\* \* \* \* \*